Figure 1:
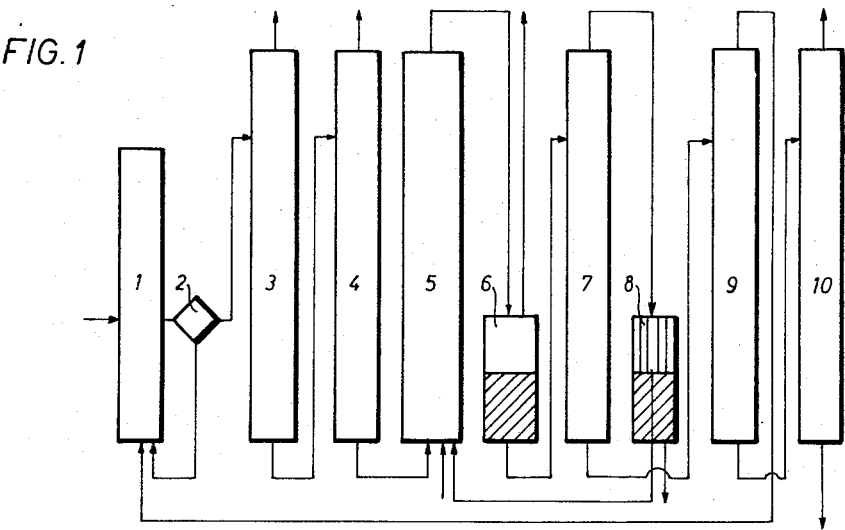
Figure 2:
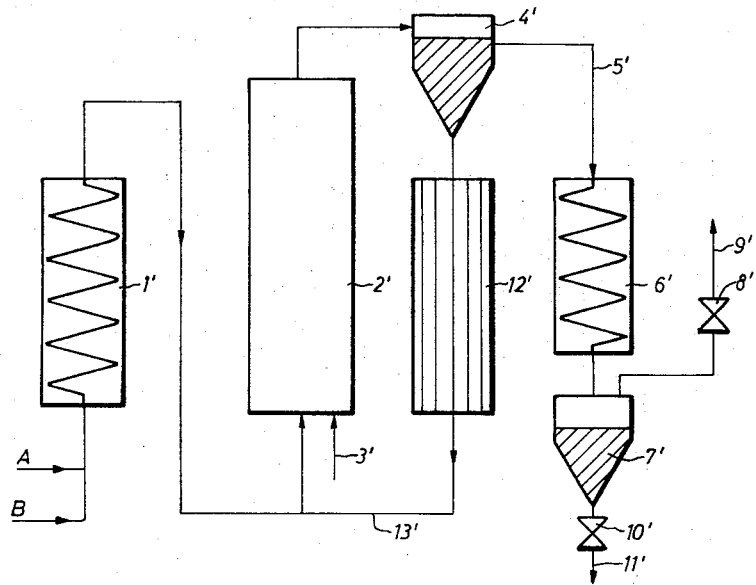

Jan. 9, 1968    W. KRONIG ET AL    3,362,987

PROCESS FOR PRODUCING ACETIC ACID

Filed May 12, 1966

United States Patent Office 3,362,987
Patented Jan. 9, 1968

3,362,987
PROCESS FOR PRODUCING ACETIC ACID
Walter Kronig, Leverkusen, Germany, and Bruno Georg Gustav Frenz, deceased, late of Leverkusen, Germany, by Waltraud Evelin Ursula Frenz, heir and legal representative, Leverkusen, Germany, and Wulf Schwerdtel and Johann Grolig, Leverkusen, Germany, assignors to Farbenfabriken Bayer Aktiengesellschaft, Leverkusen, Germany, a corporation of Germany
Filed May 12, 1966, Ser. No. 549,735
Claims priority, application Germany, Dec. 17, 1962, F 38,574; Nov. 11, 1963, F 41,322, F 41,323
12 Claims. (Cl. 260—497)

This application is a continuation-in-part of copending application Ser. No. 332,413, filed Dec. 23, 1963, now abandoned.

The present invention relates to a process for producing acetic acid. An object of this invention is to provide a novel process for obtaining secondary butyl acetate, and optionally in turn acetic acid, from n-butenes. A further object of the invention is to provide for the conversion of secondary butyl acetate into acetic acid substantially exclusively, and more specifically, the production of 3 mols of acetic acid correspondingly from 1 mol of secondary butyl acetate merely by treatment with gaseous oxygen in an acetic acid reaction medium in the absence of a specific oxidation catalyst.

The first mentioned object is achieved generally by reacting n-butenes, substantially free from isobutene, and acetic acid in the presence of a solid acidic catalyst, whereby secondary butyl acetate is formed, and optionally oxidizing such secondary butyl acetate in a further step in the absence of catalysts to form acetic acid. The second mentioned object is achieved generally by oxidizing secondary butyl acetate derived from any source to achieve the stated oxidation whereby to form acetic acid substantially exclusively, and preferably in a ratio of 3 mols of acetic acid per mol of starting secondary butyl acetate.

In particular, it has now been found in accordance with the present invention that an efficient process for the production of acetic acid from secondary butyl acetate may be provided which comprises oxidizing secondary butyl acetate with gaseous oxygen in liquid phase in an acetic acid reaction medium at a temperature between 150 and 250° C. and a pressure between about 30 and 100 atmospheres to form as reaction product in said reaction medium acetic acid in a substantial molar excess over the corresponding molar quantity of secondary butyl acetate used.

Furthermore, it has been found that an efficient process for the production of secondary butyl acetate may now be provided which comprises reacting n-butenes, substantially free from iso-butene, and a molar excess of acetic acid in liquid phase at a temperature substantially between about 80 and 120° C. in the presence of a solid acidic catalyst selected from the group consisting of tungstic acid and an organic cation exchange resin.

Optionally, an overall versatile process may be provided which comprises reacting n-butenes, substantially free from iso-butene, and a molar excess of acetic acid in liquid phase at a temperature substantially between about 80 and 120° C. in the presence of a solid acidic catalyst selected from the group consisting of tungstic acid and an organic cation exchange resin to form secondary butyl acetate in the resultant acetic acid reaction medium, removing said solid acidic catalyst and unreacted n-butenes from such reaction medium, and oxidizing secondary butyl acetate in said acetic acid reaction medium with gaseous oxygen in the liquid phase at a temperature between about 150 and 250° C. and a pressure between about 30 and 100 atmospheres, to form, as reaction product in said reaction medium, acetic acid in a substantial molar excess over the corresponding molar quantity of secondary butyl acetate oxidized.

The overall process according to the present invention may be represented by the following equation:

$$1CH_3COOH + C_4H_8 \longrightarrow CH_3COOC_4H_9 \xrightarrow{+2O_2} 3CH_3COOH$$

The n-butenes used in the instant process are readily available products as are the secondary butyl acetate, acetic acid, and gaseous oxygen.

For the first reaction of the overall process according to the invention, the n-butenes used may be pure n-butenes or a mixture of n-butenes and other relatively inert inactive hydrocarbons, e.g. butanes, but the mixtures used should not contain appreciable amounts of iso-butene. The iso-butene content should in fact be as low as possible, preferably below 1% or even less.

Suitable butene starting materials may be obtained according to conventional methods. Thus, in numerous conventional petroleum cracking processes, $C_4$ hydrocarbons containing considerable quantities of olefines are obtained. If these processes are carried out at very high temperatures so that cracking is effected by so-called pyrolysis, the $C_4$ fractions also contain considerable quantities of butadiene. A frequently used process for working up such $C_4$ fractions consists in recovering the butadiene contained in the fractions and removing the iso-butene from the remaining $C_4$ current, for example by means of oligomerization, especially dimerization. A mixture of n-butenes and butanes is thereby obtained. Such a mixture can also be obtained by conventional catalytic dehydrogenation of n-butane.

The acetic acid used in this first reaction is preferably a concentrated acetic acid, especially water-free acetic acid (glacial acetic acid).

Suitably, the reaction of acetic acid and n-butenes is carried out in the presence of solid acidic catalysts, such as tungstic acid, and/or organic cation exchange resins, e.g. those containing sulfonic acid groups.

The preferred catalysts, however, are organic solid acidic catalysts such as the known cation exchange resins which contain sulfonic acid groups, and more specifically synthetic cross-linked polymers of aromatic vinyl compounds which contain sulfonic acid groups. These cation exchange resins may be obtained by polymerization or copolymerization of vinyl aromatic compounds followed by sulfonation. Examples of aromatic vinyl compounds suitable for the production of the polymers or copolymers are styrene, vinyl toluenes, vinyl naphthalenes, vinyl ethyl benzenes, methyl styrenes, vinyl chlorobenzenes and vinyl xylenes. Many different methods may be used for the production of these polymers, for example polymerization on its own, i.e. homopolymerization, or in mixtures with other monovinyl compounds, or cross-linking with polyvinyl compounds such as divinyl benzenes, divinyl toluenes or divinyl phenyl vinyl ethers, etc. The polymers may be produced in the presence or absence of solvents or dispersing agents and with the use of many different types of polymerization initiators such as inorganic or organic peroxides, persulfates and others.

The sulfonic acid group may be introduced into these vinyl aromatic polymers by known methods for example by sulfonating the polymers with concentrated sulfuric acid or chlorosulfonic acid or also copolymerization of copolymerizable aromatic compounds which carry sulfonic acid groups (see e.g. U.S. Patent 2,366,007). In addition, other sulfonic acid groups may be introduced into these polymers that already contain sulfonic acid groups by treatment with oleum, i.e. sulfuric acid containing sulfur trioxide. The treatment with oleum is preferably carried out at ( to 150° C. and the sulfuric acid preferably contains so much sulfur trioxide that after sulfonation is completed the sulfonating acid still contains between 10 to 50% of free sulfur trioxide. The resulting products preferably contain an average of 1.3 to 1.8 sulfonic acid groups per aromatic nucleus. Particularly suitable for the process according to the invention are copolymers, containing sulfonic acid groups, of aromatic monovinyl compounds with aromatic polyvinyl compounds (especially divinyl compounds) in which the polyvinyl benzene portion preferably amounts to 1 to 20% by weight of the copolymer (see e.g. German Patent 908,247).

All these solid acidic catalysts are advantageously used in finely grained form. The cation exchangers should have e.g. grain sizes of substantially about 0.1 to 50μ and preferably 0.5 to 30μ.

To carry out the first reaction, the reactants, i.e. n-butenes and acetic acid, are mixed to form a homogeneous liquid solution. A molar excess of acetic acid of at least about 10%, and preferably, for example, a ratio of 2 mols of acetic acid to 1 mol of butene or even a higher excess of acetic acid, is contemplated by this process step.

The mixture of reaction components is introduced into the reaction vessel which contains the catalyst, e.g. an acidic cation exchange resin, suspended in previously introduced reaction mixture, preferably in a concentration between about 1 and 20% by weight, and most preferably between 5 and 15% by weight, based on the amount of acetic acid contained in the newly introduced mixture of reaction components. The resin catalysts are typically used in an amount such that correspondingly between about 0.1 and 1, and preferably between 0.2 and 0.4, mols of hydrogen ions (protons) are present in such cation exchange resin per mole of acetic acid present.

The contents of the reactor, i.e. in liquid phase, may be kept well mixed by stirring, pumping, or other measures. Temperatures between about 80 and 120° C., preferably 100 to 110° C., may be generally employed. The vapor pressure then adjusts itself to about 10 atmospheres. However, higher pressures may be employed, for example pressures of 20 atmospheres or more, by introducing inert gases under pressure. It is generally sufficient to work with average residence time of about 30 minutes to 3 hours, preferably 1 to 1½ hours. The reaction may be carried out in batches, although it is generally more advantageous to operate continuously and to pass the reaction components through one or more reactors connected in series.

After completing the reaction, the catalyst is removed from the reaction mixture. In the case of finely divided solid acid cation exchangers, this may be done, for example, by allowing the catalyst to settle or by filtering or centrifuging techniques; separating by centrifuging under pressure is particularly suitable. If finely divided catalyst is still present in the clarified centrifuge product (top running), it can be removed by a subsequent fine filtration. The centrifuge residue (bottom running) is returned to the one or more reactors.

The effect of the catalyst may diminish somewhat in the course of time. A portion of the catalyst may be removed therefore from circulation and replaced by fresh catalyst.

The first reaction may also be carried out with catalysts fixed in the reaction chamber (fixed bed catalysts). Catalysts based on tungstic acid are particularly suitable for this method. It has been found advantageous to add other substances to the tungstic acid, for example phosphoric acid, silicic acid, and metal oxides such as tin oxide, zinc oxide, etc. Particularly suitable are complex tungstic acids such as phosphoric-tungstic acid, silico-tungstic acid, etc. It is advantageous to reduce these catalysts with hydrogen at elevated temperature before they are used in the reaction. All these catalysts may be considered as tungstic acid-containing catalysts.

The reaction of olefins, in excess, and substantially anhydrous fatty acids in the presence of sulfuric acid as a catalyst has already been described in U.S. Patent 1,877,291 to Frolich. In contrast thereto, in accordance with the present invention, though an excess of acetic acid is used, the catalysts are solid acidic substances, especially sulfonated cation exchange resins. As will be seen hereinafter, it is essential to remove the catalyst of the first reaction, if the reaction mixture is to be subjected to the second reaction. This cannot easily be done with liquid catalysts. It is therefore a considerable improvement to use solid catalysts, especially cation exchange resins, as these catalysts may be easily and completely removed by filtration. From U.S. Patent 3,026,362 to McKeever, it is known that sulfonated cation exchange resins are usable as esterification catalysts for esterifying isobutylene and lower alkanoic acids, but the catalytic activity of such resins is restricted to iso-butylene since, where mixtures of iso-butene and n-butenes are used, the n-butenes are stated to be non-reactive. It is therefore surprising that these same resin catalysts are useful in accordance with the present invention where the n-butene mixtures to be reacted are essentially free from iso-butene.

Advantageously, the reaction product, i.e. secondary butyl acetate, of the first reaction or stage may be used directly in the second reaction or stage, i.e. the oxidation. As aforesaid, however, it is necessary to remove completely the catalyst used in the first reaction. Furthermore, after removal of the catalyst, unreacted ($C_4$) hydrocarbons should also be removed, preferably by distillation. The remaining reaction mixture which comprises essentially secondary butyl acetate and a substantial amount of acetic acid is then subjected to the oxidation reaction.

This oxidation is preferably carried out with gaseous oxygen. It is carried out in the liquid phase by passing the reaction mixture from the first reaction, together with an oxygen-containing gas, through a reactor. It is advantageous to work with vertical reaction tubes through which the reaction components flow upwardly, although other arrangements may, of course, be chosen.

This second reaction is carried out advantageously in the absence of catalysts, yet in the presence of the excess acetic acid medium contained in the mixture to be oxidized.

It has been found advantageous to return a portion of the reaction product to the input end of the reactor as this accelerates the start of the oxidation reaction. This return of reaction product may be carried out especially advantageously by back mixing in the reactor. The oxidation itself is carried out at temperatures of about 150 to 250° C., preferably 180 to 220° C., and at pressures of about 30 to 100 atmospheres, preferably 40 to 70 atmospheres. Air may be used as oxidizing agent, but it is also possible to work with a gas cycle and supply oxygen to the circulating inert gas, using oxygen contents between e.g. 10 and 50 volumes percent in the input gas. The ratio of liquid starting material and oxygen introduced is preferably so chosen that the oxygen concentration in the gas at the end of the reaction chamber is between 0.5 and 5 volumes percent. The secondary butyl acetate entering the reaction can be converted in a single passage through the reactor to the extent of about 20 to 70%, preferably 30 to 50%.

It is essential that the acetic acid be present in this step in a substantial amount as a reaction medium or solvent for the secondary butyl acetate. This amount of acetic acid may be from about 10 to 300% by weight of the secondary butyl acetate. The oxidation reaction proceeds according to the following schematic equation:

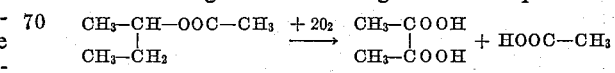

This reaction is very surprising as it would have been expected that the oxidation would instead lead to at most 1 mol of acetic acid and 1 mol of butyric acid and/or other oxidation products including ketones, alcohols, etc. Indeed in accordance with the teaching of U.S. Patent 2,530,512 to Drewitt, such multiple products are obtained in accordance with the expected 1:1 molar selectivity of products.

Due to side reactions the actual yield of acetic acid in the present process is generally between 2 and 3 mols per mol of secondary butyl acetate. In the commercial scale process this yield will vary between about 2.1 and 2.8 mols of acetic acid per mol of secondary butyl acetate. In any case, this yield is substantially more than 2 mols of acetic acid per mol of secondary butyl acetate.

The heat of reaction which occurs during the oxidation reaction can be removed by a cooling system arranged in the reactor. In a preferred embodiment of the invention, the heat of reaction obtained during the oxidation of the butyl acetate is taken up by the reaction product, which is withdrawn, fed to a cooling system and recycled to the oxidation reactor for this purpose. This preferred embodiment of the invention can be carried out for example in the following manner:

For the oxidation reaction, a pressure vessel is used which is arranged vertically or horizontally. This pressure vessel is substantially free of installations, especially of cooling systems; that means it is practically an empty vessel. The reaction participants are introduced into this reaction vessel from below. These reaction components consist of the product of the first reaction stage which is freed from solid material and from $C_4$ hydrocarbons. This product consists mainly of secondary butyl acetate and acetic acid. As further reactants there are introduced products of the second reaction stage, the oxidation step, namely the components obtained by the distillative working up of the oxidation products which consist of unreacted butyl acetate and intermediate oxidation products. As further reaction component there is introduced into the oxidation reaction oxygen, preferably as compressed air or as another oxygen containing gas mixture. The gaseous components are introduced into the oxidation vessel in finely divided form, for example through a larger number of nozzles, through frits or through other suitable distribution means. The vessel, wherein the oxidation is carried out, is filled with liquids through which the finely divided gaseous reaction components bubble through. The reaction product and unreacted gaseous components leave the reactor at the upper part. Furthermore liquid reaction medium is removed from the upper part of the reactor. These products leaving the reactor are introduced into a separator wherein a certain liquid level is maintained by means of an overflow pipe. Through the overflow pipe there is removed an amount of liquid reaction product which corresponds to the amount of fresh liquid components introduced into the reaction. Together with the liquid reaction product the reaction gas is removed from the separator. This mixture is cooled in general to room temperature. Thereafter gaseous products and liquid products are separated in a second separator. From the lower part of the first separator liquid reaction product is removed and carried through a heat exchanger wherein an amount of heat, which corresponds to the heat of reacton taken up in the reactor, is removed from the product. The heat given off in the heat exchanger can be used for example for the heating and evaporation of water, thus producing for example steam necessary for the distillations; the heat exchanger works here as waste heat boiler. The product leaving the heat exchanger at its lower parts is again introduced into the oxidation at the lower part of the oxidation reactor. The process can be carried out for example also in such a manner that the separation effected in the first mentioned separator is carried out in the upper part of the reactor itself, whereby preferably the conducting of gas into the heat exchanger is avoided by an arrangement of guide baffles. The temperature of the reaction product recycled through the heat exchanger is adjusted in the heat exchanger to the best suitable temperature for introducing the product again into the reactor. The amount of product which is recycled into the reactor through the heat exchanger corresponds to about 50 to 150, preferably 75 to 125, times the amount of liquid product which is introduced into the oxidation reactor as fresh product to be oxidized. This freshly introduced product corresponds to the sum of the products obtained from the first reaction stage and the product recycled from the distillation step of the working up of the oxidation product. Recycling can be effected by suitable mechanical means, such as propellers or rotary pumps, which are arranged in the cycle, for example, after the heat exchanger. It has proved that by the application of towerlike reactors the recycling is in general sufficiently effected by the density difference between the reactor content containing gases and practically gas free recycled liquid. The process described indicates a method wherein the heat of reaction of the oxidation step is removed and used in a very advantageous manner. By this procedure about 100 times the liquid quantity is recycled via the heat exchanger to remove the heat of reaction and thereby any rise of temperature in the oxidation reactor is kept within very moderate limits, for example 5 to 20° C., thus avoiding an unfavorable influence of the oxidation reaction by such as undesired rise of temperature. It is in general of advantage if the total feed, that means fresh plus recycled product, is introduced into the oxidation reactor with a temperature of between about 180 to 210° C. The fresh product can be added to the recycled product with or without heating. In general pressures of about 30 to 100 atmospheres, preferably 40 to 70 atmospheres are used. The process described with an intensive recycling of the reaction products over an heat exchanger makes it possible to use high throughputs. Thus acetic acid can be obtained in hourly amounts of 200 to 500 g./liter reaction volume without observing an undesired temperature rise in the oxidation reaction.

The reaction products introduced in the second separator can be separated into gas on the one hand and liquid reaction products on the other. The pressure of the gas can be released or the gas can be returned to the reactor after oxygen has been added to it. The pressure of the liquid reaction products is released, whereupon the gaseous reaction products dissolved in them (carbon dioxide and carbon monoxide) are liberated. Low boiling point intermediate products of oxidation and unreacted secondary butyl acetate are distilled off from the reaction product, preferably in the presence of steam which is returned to the distillation after it condenses, and the distilled products are preferably returned to the reactor. A portion of the acetic acid remaining behind as distillation residue may be returned directly for the first stage of the reaction, but in some cases it is advantageous if this returned portion of acetic acid is first freed from small quantities of high boiling point products that are formed, either by distillation or by other measures such as treatment with bleached earths or active charcoal. If necessary, residual quantities of water are also removed by distillation from the acetic acid before it is returned. Any acetic acid that is not returned is converted into the usual commercial form by distillation, refining or other means.

During the oxidation step there are formed as byproducts small amounts of formic acid which become enriched in the reaction components through the recycling. This formic acid can be removed to a very large extent by the following method:

The formic acid leaving the oxidation stage is recycled with those parts of the acetic acid which are introduced again into the first reaction stage. In the first reaction stage the formic acid is reacted to a large extent to secondary butyl formate. This compound can be easily removed from the reaction product of the first reaction step, which is freed from solid material and C$_4$ hydrocarbons, by a distillation step together with the main part of free formic acid. In more detail this procedure can be carried out for example in the following manner:

In the first reaction stage there are introduced the n-butenes together with acetic acid obtained from the second stage of the process. In this first reaction stage the reaction between the butenes and the acetic acid under formation of secondary butyl acetate takes plate. In the second reaction stage, the oxidation step, small amounts of formic acid are formed as by-products of the oxidation which are recycled together with acetic acid in the first reaction step. Thus, the formic acid accumulates in the recycling products until a certain level is obtained. It is now desired to keep this formic acid level as low as possible. To reach this aim the following procedure can be used:

In the first reaction step a large part of formic acid introduced reacts with butenes under formation of secondary butyl formate which dissolves in the reaction products of the first reaction step. After leaving the first reaction step the product obtained is freed from solid particles and from C$_4$ hydrocarbons. The product thus obtained is subjected to a distillation in such a manner that the butyl formate is taken overhead together with unreacted formic acid. The bottom product of the distillation contains only small amounts of butyl formate and formic acid. By this procedure it is possible to obtain a low level of formic acid in the recycled products. The distillative working up of the reaction products of the second step, the oxidation reaction, can be carried out for example in the following manner:

In a first distillation there are taken overhead together with the water formed in the oxidation reaction the unreacted butyl acetate and the lower boiling intermediate products of the oxidation. The distillate is cooled and separated into two layers. The layer containing the organic products can be recycled to the oxidation step and the aqueous layer can be partly recycled to the first distillation to facilitate the azeotropic distillation of the overhead product. Furthermore there can be obtained from the aqueous layer the organic products contained therein, for example by distillation. The bottom product of the first distillation goes to the second distillation. In this second distillation the amount of acetic acid which is needed for the first reaction step is taken overhead. The small amounts of butyl acetate and formic acid contained in the bottom product of the first distillation are taken overhead as well. The bottom product of the second distillation can be introduced into a third distillation where pure acetic acid can be obtained as distillate and final product while the bottom product contains small amounts of higher boiling products consisting mainly of higher carboxylic acids.

The reaction sequence may also be used for producing secondary butyl acetate from n-butenes by removing a portion of the secondary butyl acetate produced in the first stage before the reaction product is put into the second stage. The separation of butyl acetate from acetic acid is also preferably carried out by steam distillation.

Example 1

A C$_4$ fraction obtained from pyrolysis of benzene hydrocarbons was used in the first stage. Butadiene was first extracted with ammoniacal copper solution from the C$_4$ fraction obtained from the products of pyrolsis. i-Butene was then converted into diisobutene/triisobutene with the aid of acid cation exchangers. The C$_4$ fraction thereby obtained had the following composition:

| | Percent by weight |
|---|---|
| Butane | 18.0 |
| i-Butene | 0.4 |
| n-Butenes | 81.6 |
| | 100.0 |

2.1 kg. of the above mentioned C$_4$ hydrocarbons and 4.0 kg. of acetic acid were introduced hourly into a vessel of 20 liters capacity and equipped with stirrer. 2 kg. of catalyst were suspended in the liquid contents of the reactor. This catalyst was an acid cation exchanger consisting of a polystyrene resin which was cross-linked with 8% of divinylbenzene and then monosulfonated. The grain size was in the region of 1 to 50$\mu$. The catalyst was retained in the vessel by a filter candle. The reaction conditions were as follows: 20 atmospheres above atmospheric pressure, 110° C., speed of rotation of the stirrer (propeller stirrer): 750 rvs. per min. The liquid product, free from catalyst, was removed over a cooler and the pressure released. Unreacted hydrocarbon gas was removed at 60 to 70° C. and ordinary pressure in an apparatus for driving off gas connected behind the reaction vessel. 0.57 kg. of gas and 5.4 kg. of liquid reaction mixture were thereby obtained per hour. The gas had the following composition:

| | Percent by weight |
|---|---|
| Butanes | 51.1 |
| n-Butenes | 48.9 |
| | 100.0 |

The liquid reaction product had the following composition:

| | Percent |
|---|---|
| Acetic acid | 54.1 |
| Sec. butyl acetate | 44.8 |
| Sec. butanol | 0.5 |
| Water | 0.2 |
| Unknown | 0.2 |
| Dissolved C$_4$ hydrocarbons | 0.2 |
| | 100.0 |

The liquid product was introduced into the oxidizing stage without further treatment.

A vertical pressure tube 23 mm. in diameter, 600 mm. in length and a free internal space of 250 cc. was used. The tube was filled with steel Raschig rings to improve the distribution of the reaction components. The reaction product of the first stage was heated to 150° C. in a coil, and the air used was also heated to 150° C. A reaction pressure of 80 atmospheres was employed. 580 g. of the product from stage 1 and 320 liters of air (measured at NTP) were passed through per hour. The reaction temperature was maintained at 190° C. by external cooling. The products leaving the reactor were cooled to room temperature, and the liquid products were separated from the gaseous products in a separator. 45% of the butyl acetate put in the reaction were converted. 80 mol percent of the butyl acetate converted was obtained as acetic acid, 11 mol percent was obtained as intermediate oxidation products [mainly methyl ethyl ketone (2.5%) and acetaldehyde (3.0%) as well as alcohols (5.5%)] and 9% as carbon monoxide and carbon dioxide.

Unreacted butyl acetate and the intermediate oxidation products were driven off with steam from the liquid reaction product obtained, and recondensed. The water of condensation thereby obtained was partly returned to the distillation as steam. The distillate obtained by the steam distillation was returned to the oxidation. The remaining acetic acid was redistilled to remove small quantities of high boiling impurities. The freshly formed acetic acid was removed. The remaining part of the acetic acid was returned to the first reaction stage.

Example 2

The first reaction stage was carried out as described in Example 1. 60% of the reaction product obtained was branched off from the cycle and the butyl acetate contained in it was separated by steam distillation from the acetic acid which was returned to the process. The small quantities of acetic acid contained in the distillate were removed by passing the product through the sodium salt of a cation exchanger. The resulting product was redistilled for further purification. Secondary butyl acetate was obtained in a degree of purity of over 99%.

The acetic acid remaining behind in the steam distillation was returned to the first reaction stage.

The portion of the reaction product of the first stage which was not introduced into the steam distillation for obtained butyl acetate was returned to the second reaction stage where it was converted into acetic acid by the method described in Example 1 and supplied the necessary acetic acid for carrying out the addition to butene in stage 1.

*Example 3*

The catalyst used for the esterification (first reaction stage) was in the form of lumps of solid catalyst fixed in a vertical reaction chamber and obtained as follows:

| | Mols |
|---|---|
| Tungstic acid | 4.0 |
| Phosphoric acid | 1.0 |
| and | |
| Tin dioxide | 0.5 | were mixed homogeneously in a ball mill with the addition of just enough water to obtain a thick paste. 10% by weight of kaolin were added to solidify the paste. The crude, moist catalyst was extruded into lumps measuring 3 x 4 mm., dried and then heated for 3 hours at 400° C. The catalyst was reduced for one hour in a stream of hydrogen without pressure at 350° C. The catalyst so obtained was used in a quantity of 300 cc. in a vertical tube. 200 g. per hour of acetic acid and 62 g. per hour of the $C_4$ fraction mentioned in Example 1 were passed in an upward stream through this catalyst at a temperature of 110 C. and a pressure of 40 atmospheres. 30% of the n-butene introduced was converted to secondary butyl acetate. The resulting reaction product was subjected to the second reaction stage as described in Example 1.

*Example 4*

(The references refer to FIGURE 1.)

Into the first reaction stage 1 there are introduced butenes and recycled acetic acid from the distillation 8 of the oxidation products which contains 2.5% formic acid. In the first reaction stage butenes and acetic acid are reacted to butyl acetate and 65% of the formic acid introduced react to butyl formate. The solid catalyst is removed from the reaction product by means of the centrifuge 2 and the catalyst is recycled to the first reaction stage. After removing the solid catalyst there are distilled off from the reaction product of the first reaction stage in the distillation 3 the non-reacted $C_4$ hydrocarbons as overhead product. The sump product of this distillation is distilled in a distillation 4 wherein 97% of the butyl formate and 95% of the formic acid contained in the product are taken overhead. The overhead product thus obtained consists to 86% of butyl formate and formic acid. The sump product of this second distillation is introduced into the second reaction stage 5, the oxidation, together with oxygen. The reaction products leaving the second reaction stage, the oxidation, are depressurized 6 and the liquid products thus obtained are introduced into the distillation 7. In this distillation the water formed and the main portion of unreacted butyl acetate is removed as overhead product. The distillate contains furthermore lower boiling oxidation products. The distillate is cooled and separated into an organic and an aqueous phase in the separator 8. The organic phase is recycled to the second reaction stage 5. The sump product of the distillation is distillated in a further distillation 9, wherein acetic acid, formic acid and the remaining amount of butyl acetate is taken overhead. The distillate thus obtained is recycled to the first reaction stage 1. The sump product of the last mentioned distillation is distilled in a further distillation, where pure acetic acid is obtained; small quantities of higher boiling material are removed as bottoms.

*Example 5*

(The references refer to FIURE 2.)

The process is carried out in principle as described in Example 1 with the following alterations. As feedstock for the second reaction stage there were used 8.8 kg. per hour of the reaction product of the first reaction stage which was freed from catalyst and from $C_4$ hydrocarbons. This feedstock contains the following compounds:

| | Percent by weight |
|---|---|
| Acetic acid (4708 g.=78.5 mols) | 53.5 |
| Butyl acetate (3784 g.=32.6 mols) | 43.0 |
| By-products (308 g.) | 3.5 |

This feedstock was introduced through pipe A.

Into the second reaction stage there were introduced furthermore 6.2 kg. per hour of products obtained from the distillative working up of the reaction products of the second reaction stage. These 6.2 kg. consist of the following components:

| | Percent by weight |
|---|---|
| Sec.-butyl acetate (4650 g.=40.1 mols) | 75 |
| Lower boiling oxidation products of the second reaction state (1240 g.) | 20 |
| Acetic acid (124 g.=2.1 mols) | 2 |
| Water (186 g.=10.3 mols) | 3 |

This product is introduced through pipe B.

The aforementioned 15 kg. are introduced through pipes A and B into the preheater 1', wherein they are heated to 200° C. Subsequently they are introduced into the tower-like reactor 2' which has a diameter of 45 mm. and a length of 4.15 m. corresponding to a reaction volume of 6.6 liters. Into the reactor there are introduced through pipe 3' through nozzles 12 Nm.$^3$ of air under the pressure of 50 atmospheres gauge. In the reaction the butyl acetate is oxidized with the oxygen contained in the air to acetic acid. From the upper part of the reactor the reaction product is withdrawn and introduced into the separator 4' where the level is kept by means of the overflow tube 5'. The reaction product and the gas leaving the reactor 4' through the overflow tube are introduced into a cooler 6' and subsequently into a separator 7' where again a level is maintained. From the gas phase the gas is depressurized through valve 8' and pipe 9'. The liquid produce (16.5 kg. per hour) is depressurized through valve 10' and led through pipe 11' to the distillative working up.

From the lower part of the separator 4' there are removed 1500 kg. per hour of liquid reaction product. This product is led through the heat exchanger 12' and recycled to the reactor 2' through pipe 13'. The 16.5 kg. per hour of reaction product consist of

| | Percent by weight |
|---|---|
| Acetic acid (8745 g.) | 53 |
| Sec.-butyl acetate (4950 g.) | 30 |
| By-products (1815 g.) | 11 |
| Water (990 g.) | 6 |

By this procedure there were obtained 350 g. of acetic acid per liter of reaction volume per hour.

The aforementioned 16.5 kg. of reaction product were worked up in the following manner:

The product was introduced into a distillation column where 7.1 kg. of overhead product and 9.4 kg. of sump product were obtained. The overhead product yielded in a separator 0.9 kg. of an aqueous layer and 6.2 kg. of an organic layer. The organic layer was recycled to the second reaction stage, the oxidation stage. The aforementioned 9.4 kg. of sump product were distilled in a further distillation, whereby 7.0 kg. of product were obtained as overhead product, which was recycled into the first reaction stage. The 2.4 kg. of sump product were introduced into a further distillation where 2.3 kg. of pure acetic acid were obtained.

Thus, 15 kg. per hour of liquid starting material are fed into the reaction. This starting material contains 80.6 mols (4832 g.) of acetic acid, 72.7 mols (8434 g.) of secondary butyl acetate and 1734 g. of other constituents. The liquid reaction product obtained was 16.5 kg. per hour and contained 145.8 mols (8745 g.) of acetic acid, 42.7 mols (4950 g.) of secondary butyl acetate and 2805 kg. of other constituents (including 55 mols, i.e., about 1 kg., of water). It is apparent, therefore, that 65.2 mols of acetic acid were newly formed and that 30 mols (3480 g.) of secondary butyl acetate were converted. Theoretical yield in the oxidation in accordance with the invention from these 30 mols of secondary butyl acetate is 90 mols of acetic acid, although it would have been expected that a maximum of only 15 mols of acetic would have been produced together with a corresponding maximum of secondary butyric acid and/or corresponding ketones, alcohols, aldehydes, etc., i.e., with a maximum theoretical selectivity of 50% for acetic acid and a minimum theoretical selectivity of 50% for such other products. The actual yield of acetic acid obtained by the industrial scale process used in practice was 72.5% of the theory or about 2.2 mols of acetic acid per mole of secondary butyl acetate converted.

It will be appreciated that the instant specification and examples are set forth by way of illustration and not limitation, and that various modifications and changes may be made without departing from the spirit and scope of the present invention which is to be limited only by the scope of the appended claims.

We claim:

1. Process for producing acetic acid which comprises reacting n-butenes, substantially free from iso-butene, and a molar excess of acetic acid in liquid phase at a temperature substantially between about 80 and 120° C. in the presence of a solid acidic catalyst selected from the group consisting of tungstic acid and finely granular organic cation exchange resin containing sulfonic acid groups to form secondary butyl acetate in the resultant acetic acid reaction medium, removing said solid acidic catalyst and unreacted n-butenes from such reaction medium, and oxidizing secondary butyl acetate in said acetic acid reaction medium with gaseous oxygen in the liquid phase at a temperature between about 150 and 250° C. and a pressure between about 30 and 100 atmospheres, to form, as reaction product in said reaction medium, acetic acid in a substantial molar excess over the corresponding molar quantity of secondary butyl acetate oxidized.

2. Process according to claim 1 wherein said solid acidic catalyst is a sulfonated cross-linked polystyrene resin having cation exchange capacity.

3. Process according to claim 2 wherein said resin has a grain size of about 0.1 to 50μ.

4. Process for producing secondary butyl acetate which comprises reacting n-butenes, substantially free from iso-butene, and a molar excess of acetic acid in liquid phase at a temperature substantially between about 80 and 120° C. in the presence of a solid acidic catalyst selected from the group consisting of tungstic acid and finely granular organic cation exchange resin containing sulfonic acid groups.

5. Process according to claim 4 wherein said solid acidic catalyst is a sulfonated cross-linked styrene resin having cation exchange capacity.

6. Process which comprises oxidizing secondary butyl acetate with gaseous oxygen in liquid phase in an acetic acid reaction medium at a temperature between about 150 and 250° C. and a pressure between about 30 and 100 atmospheres to form as reaction product in said reaction medium acetic acid in a substantial molar excess over the corresponding molar quantity of secondary butyl acetate used.

7. Process which comprises oxidizing secondary butyl acetate with gaseous oxygen in liquid phase in an acetic acid reaction medium at a temperature between about 150 and 250° C. and a pressure between about 30 and 100 atmospheres to transform said secondary butyl acetate into acetic acid as substantially the only reaction product in said reaction medium in a substantial molar excess above about 2:1 and within the order of about 3:1 with respect to the corresponding molar quantity of secondary butyl acetate used.

8. Process according to claim 7 wherein said secondary butyl acetate and acetic acid reaction medium are used in the form of a reaction mixture obtained from the conversion of n-butenes, substantially free from isobutene, with acetic acid into secondary butyl acetate at a temperature between about 80 and 120° C. in liquid phase in the presence of an acid catalyst selected from the group consisting of tungstic acid and finely granular organic cation exchange resin containing sulfonic acid groups and having a grain size substantially between about 0.1 and 50μ.

9. Process according to claim 7 wherein said oxidizing is carried out only partly in liquid phase.

10. Process according to claim 7 wherein said gaseous oxygen is provided in the form of an oxygen-containing gas.

11. Process according to claim 7 wherein the oxidizing is carried out continuously and at least a portion of the acetic acid reaction medium including such acetic acid reaction product is withdrawn, cooled and recycled as acetic acid reaction medium for the oxidation, whereby the heat of reaction evolved during the oxidizing and taken up by the reaction medium is removed and the initiation of the oxidizing is accelerated.

12. Process according to claim 11 wherein the recycled portion of the acetic acid reaction medium is 50 to 150 times the amount of the fresh feed introduced for the oxidizing step.

References Cited
UNITED STATES PATENTS

| | | | |
|---|---|---|---|
| 1,877,291 | 9/1932 | Frohlich et al. | 260—497 |
| 2,530,512 | 11/1950 | Drewitt | 260—541 |
| 3,026,362 | 3/1962 | McKeever | 260—497 |

LORRAINE A. WEINBERGER, *Primary Examiner.*

V. G. GARNER, *Assistant Examiner.*